US012743010B2

(12) United States Patent
Akamatsu et al.

(10) Patent No.: US 12,743,010 B2
(45) Date of Patent: Sep. 22, 2026

(54) CAMERA AND SWITCH

(71) Applicants: NIDEC PRECISION CORPORATION, Tokyo (JP); FUJIFILM CORPORATION, Tokyo (JP)

(72) Inventors: Yusuke Akamatsu, Tokyo (JP); Tomihiro Wakayama, Tokyo (JP); Akihiro Hashiguchi, Tokyo (JP)

(73) Assignees: NIDEC PRECISION CORPORATION, Tokyo (JP); FUJIFILM CORPORATION, Tokyo (JP)

( * ) Notice: Subject to any disclaimer, the term of this patent is extended or adjusted under 35 U.S.C. 154(b) by 158 days.

(21) Appl. No.: 18/764,179

(22) Filed: Jul. 4, 2024

(65) Prior Publication Data

US 2025/0020982 A1 Jan. 16, 2025

(30) Foreign Application Priority Data

Jul. 12, 2023 (JP) ................................. 2023-114729

(51) Int. Cl.
*G03B 17/56* (2021.01)
*G03B 9/06* (2021.01)

(52) U.S. Cl.
CPC ............. *G03B 17/565* (2013.01); *G03B 9/06* (2013.01)

(58) Field of Classification Search
None
See application file for complete search history.

(56) References Cited

U.S. PATENT DOCUMENTS 1,750,830 A * 3/1930 Wollensak ............... G03B 9/08 396/500
3,098,422 A * 7/1963 Urabe ...................... G03B 9/08 396/508

(Continued)

FOREIGN PATENT DOCUMENTS

CN 1175706 A 3/1998
CN 205157821 U 4/2016

(Continued)

OTHER PUBLICATIONS

Extended European Search Report in EP Application No. 24187483.3, dated Dec. 23, 2024. 9pp.

*Primary Examiner* — Rodney E Fuller
(74) *Attorney, Agent, or Firm* — HAUPTMAN HAM, LLP

(57) ABSTRACT

A camera includes a lens, and aperture blades. The aperture blades are movable between a minimum aperture position at which the aperture blades generate vignetting at a periphery of the photographing area and a maximum aperture position radially outward from the minimum aperture position. The camera further includes a switch including an operation lever movable through a user operation and an actuation lever connected to the aperture blades and operable to move the aperture blades between the minimum aperture position and the maximum aperture position in response to movement of the operation lever. The operation lever is movable in a circumferential direction about an optical axis. The actuation lever is rotatable about an axis. The operation lever has a cam slot elongated in the circumferential direction between an inner portion and an outer portion. The actuation lever includes a follower engageable with and movable along the cam slot.

15 Claims, 11 Drawing Sheets

(56) References Cited

U.S. PATENT DOCUMENTS

| | | | | | |
|---|---|---|---|---|---|
| 3,139,804 | A * | 7/1964 | Jakob | G03B 7/085 | 396/220 |
| 3,188,934 | A * | 6/1965 | Ataka | G03B 7/085 | 396/220 |
| 3,464,340 | A * | 9/1969 | Yoshihisa | G03B 7/003 | 396/509 |
| 3,589,259 | A | 6/1971 | Imai | | |
| 3,906,518 | A | 9/1975 | Kobori et al. | | |
| 5,745,814 | A * | 4/1998 | Kanbayashi | G03B 9/22 | 396/460 |
| 7,427,758 | B2 * | 9/2008 | Garman | G01J 5/06 | 250/347 |
| 8,164,813 | B1 * | 4/2012 | Gat | G02B 5/005 | 396/510 |

FOREIGN PATENT DOCUMENTS

| | | | |
|---|---|---|---|
| GB | 1211264 | A | 11/1970 |
| JP | S49067622 | A | 7/1974 |
| JP | H06242492 | A | 9/1994 |
| JP | H09026611 | A | 1/1997 |
| JP | 2001-066659 | A | 3/2001 |
| JP | 2016133627 | A | 7/2016 |
| JP | 2019090968 | A | 6/2019 |

* cited by examiner 60
62
61
63
64
74
71
70
76
23B
23A
23
22B
22A
22
21B
21A
21
41
43
42
47
45
48
40
49
19B
19A
18A
18
50
52
51C
51
56
55
17
16
P
82
81
80
X
Y
Z 30
49
51A
51
P
22
21
23
52
56
56A
51A
56B
44
51C
50
44A
40
48
81
41
41A
54
Y
X
Z
78 77
76
41C 50
51
51A
52
51A
51C
54
56
Z
X
Y 49
P
22
21
23
41B
57A
41A
42
43
41
53
42A
47
56
54
40
44
56A
56B
57B
44A
82
CLOSING DIRECTION
81
80
45
OPENING DIRECTION
Y
Z
X
78
77
50
48
76
41C 22
30
21
22A(62)
21A(61)
21B
74
P
70
23A(63)
50
86
71(64)
F2
49
81
87
Y
23
78 77
Z X
56A
56
56B
76

CAMERA AND SWITCH

RELATED APPLICATIONS

The present application claims priority to Japanese Application Number 2023-114729, filed Jul. 12, 2023, the disclosure of which is hereby incorporated by reference herein in its entirety.

BACKGROUND

Technical Field

The present invention relates to a camera.

Description of the Background

Cameras usually include an aperture to capture images at optimal exposure (for example, refer to Patent Literature 1). The aperture in such a known structure is used to adjust the amount of light, but is not used to, for example, add an aesthetic or artistic effect to an image to be captured. After being captured, a digital photograph may undergo data modification to add an aesthetic or artistic effect to the image. However, an analogue photograph cannot undergo such post-edition, for which techniques are awaited for producing an image by adding an aesthetic or artistic effect to an analogue photograph.

CITATION LIST

Patent Literature

Patent Literature 1: Japanese Unexamined Patent Application Publication No. 2016-133627

BRIEF SUMMARY

In response to the above issue, one or more aspects of the present invention are directed to a camera that can easily capture an image with either or both of aesthetic and artistic effects, and a switch included in such a camera.

A camera according to an aspect of the present invention can easily capture an image with either or both of aesthetic and artistic effects. The camera includes at least one lens that forms an image of a subject in a photographing area of a photographic film, and at least one aperture blade in front of the at least one lens. The at least one aperture blade is movable between a minimum aperture position at which the at least one aperture blade generates vignetting at a periphery of the photographing area and a maximum aperture position radially outward from the minimum aperture position. The camera further includes a switch including an operation lever movable through a user operation and an actuation lever connected to the at least one aperture blade. The actuation lever is operable to move the at least one aperture blade between the minimum aperture position and the maximum aperture position in response to movement of the operation lever.

A switch according to another aspect of the present invention is easily switchable through movement of an operation lever in a circumferential direction with a simple structure. The switch includes a base, an operation lever movable on the base in a circumferential direction about a first axis, an actuation lever rotatable about a second axis, and a cam assembly that converts movement of the operation lever to rotation of the actuation lever. The cam assembly includes a cam slot in one of the operation lever or the actuation lever, and a follower on the other of the operation lever or the actuation lever. The follower is engageable with the cam slot and movable along the cam slot. The switch further includes a pusher that applies a force to the follower in the cam assembly. The cam slot in the cam assembly includes an inner portion and an outer portion located radially outward from the inner portion with respect to the first axis. The cam slot is elongated in the circumferential direction between the inner portion and the outer portion. The follower in the cam assembly is movable between a first follower position in the inner portion of the cam slot and a second follower position in the outer portion of the cam slot. The pusher pushes the follower in the cam assembly toward the first follower position in response to the follower being closer to the first follower position than to a reference follower position, and pushes the follower in the cam assembly toward the second follower position in response to the follower being closer to the second follower position than to the reference follower position.

A camera according to still another aspect of the present invention includes the switch described above.

The structures according to the above aspects of the present invention allow the aperture blade to move between the minimum aperture position and the maximum aperture position through a user operation on the operation lever in the switch. When the aperture blade is at the minimum aperture position, vignetting occurs at the periphery of a photographing area of a photographic film, and thus the periphery of an image to be captured can be darkened. This allows capturing of a photograph with either or both of aesthetic and artistic effects to further highlight the center, or more specifically, a photograph with vignetting effects.

DETAILED DESCRIPTION

Figure 1:
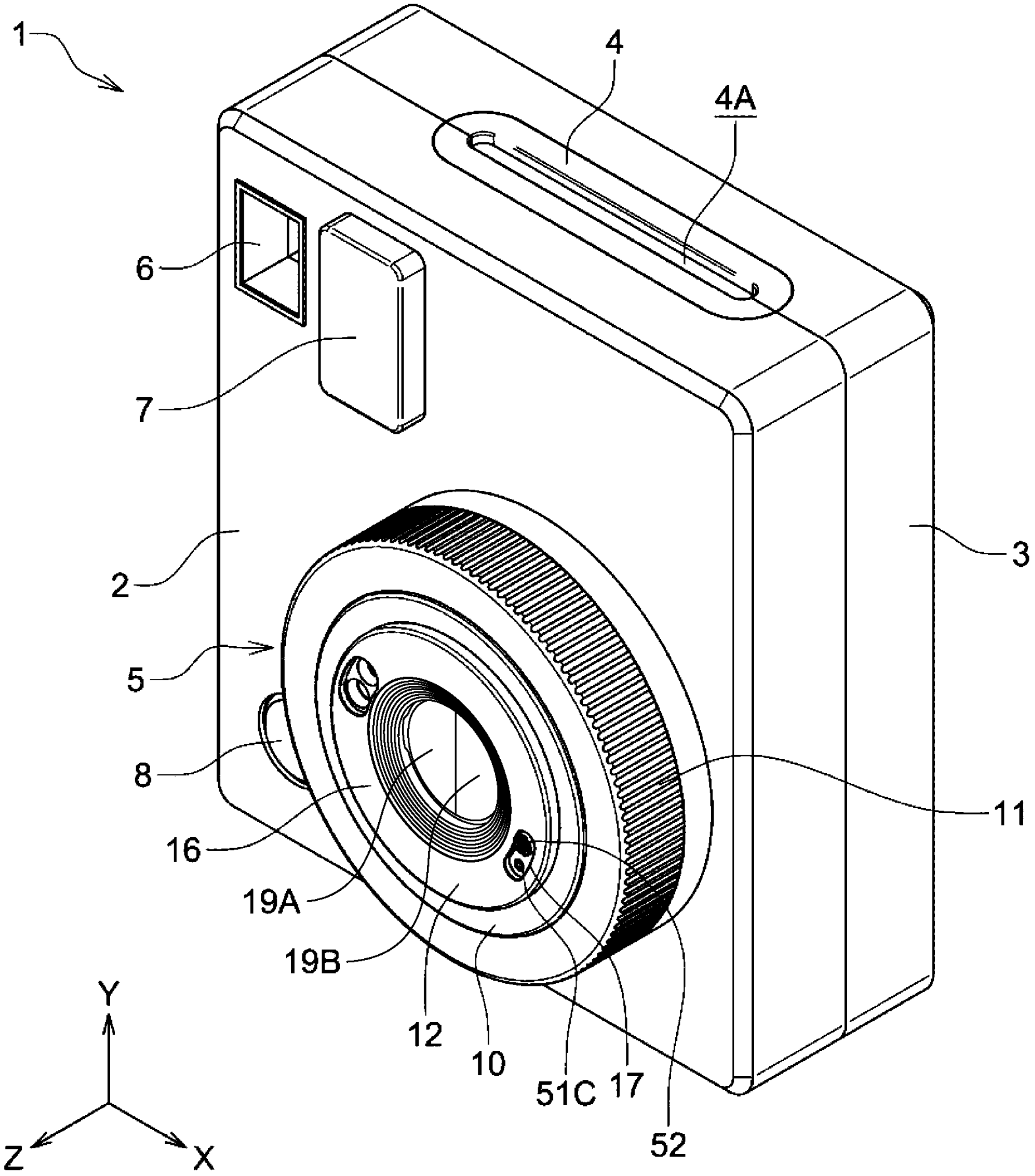
FIG. 1 is a perspective view of a camera according to one embodiment of the present invention.

A camera according to one or more embodiments of the present invention will now be described in detail with reference to FIGS. 1 to 13. In FIGS. 1 to 13, like reference numerals denote like or corresponding components. Such components will not be described repeatedly. In FIGS. 1 to 13, the scale and dimensions of each component may be exaggerated, or one or more components may not be shown. Unless otherwise specified, the terms such as first and second will be used simply to distinguish the components and will not represent a specific order or sequence.

FIG. 1 is a perspective view of a camera 1 according to one embodiment of the present invention. Although the camera 1 according to the present embodiment is a camera (instant camera) using photographic films to be automatically developed after photographing, one or more embodiments of the present invention are also applicable to a camera other than such an instant camera. In the present embodiment, for ease of explanation, front or frontward refers to a direction toward a subject in an optical axis direction (the positive Z-direction in FIG. 1), and rear or rearward refers to a direction toward the camera 1 (the negative Z-direction).

As shown in FIG. 1, the camera 1 includes a front cover 2, a rear cover 3 attached to the rear of the front cover 2, a top cover 4 held between the front cover 2 and the rear cover 3, and a lens barrel 5 containing a lens unit. The front cover 2 includes a viewfinder 6. A flash window 7 is located adjacent to the viewfinder 6. A release button 8 is located in the negative Y-direction from the viewfinder 6. The top cover 4 has an ejection slit 4A elongated in X-direction, through which a photographic film developed after photographing is ejected.

The lens barrel 5 includes an outer cylinder 10, an operation ring 11 covering the outer circumference of the outer cylinder 10, and an inner cylinder 12 located radially inward from the outer cylinder 10 and extendable in an axial direction. The operation ring 11 is rotatable outside the outer cylinder 10. Rotating the operation ring 11 relative to the outer cylinder 10 extends the inner cylinder 12 forward with an extension assembly (not shown).

Figure 2:
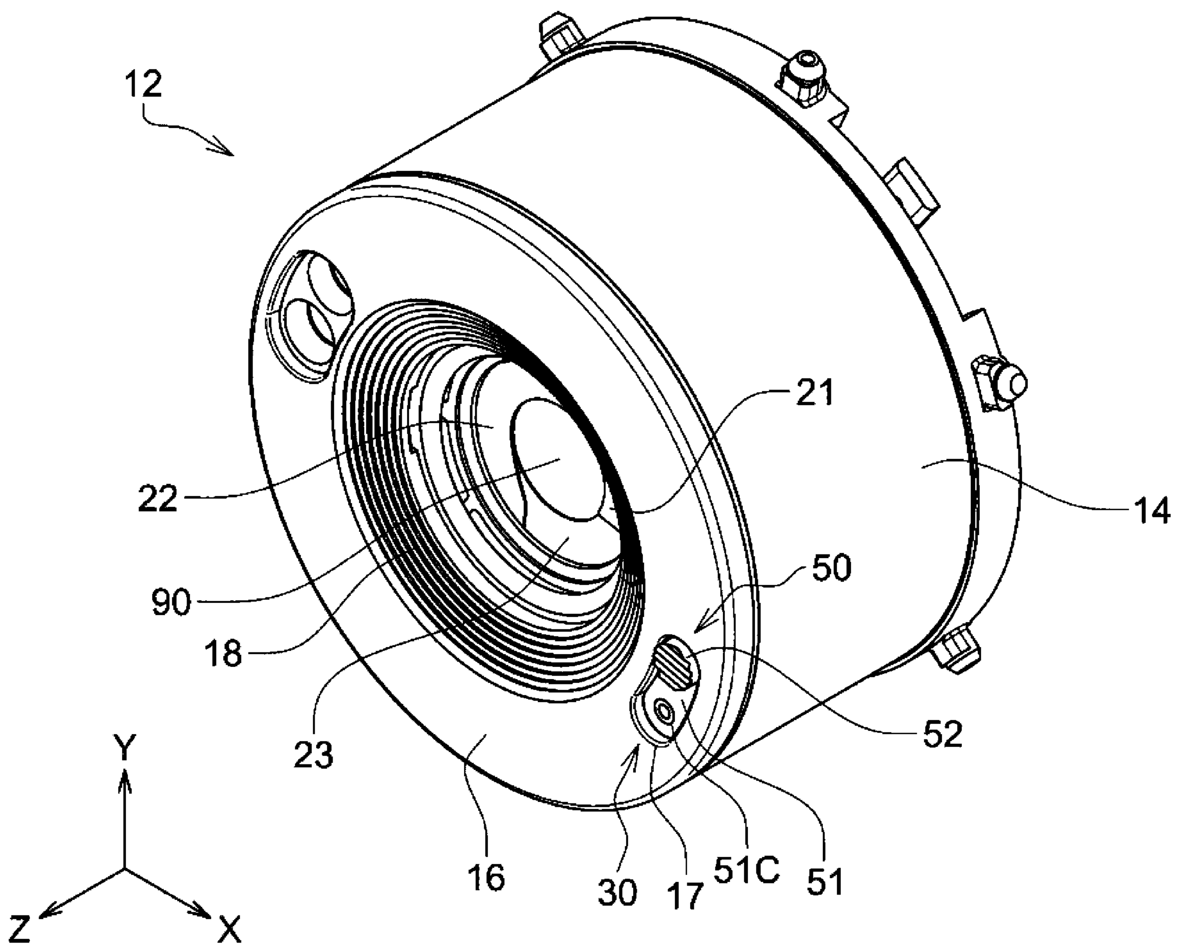
FIG. 2 is a perspective view of an inner cylinder in the camera shown in FIG. 1.

FIG. 2 is a perspective view of the inner cylinder 12. As shown in FIG. 2, the inner cylinder 12 includes a cylindrical body 14, an annular cover plate 16 attached to the front of the cylindrical body 14, three aperture blades 21 to 23, a switch 30 that can switch the aperture blades 21 to 23 between a minimum aperture position and a maximum aperture position, and one or more lenses 90 that form an image of a subject in a photographing area of the photographic film. FIG. 2 shows the aperture blades 21 to 23 switched to the minimum aperture position by the switch 30. The inner cylinder 12 further includes aperture blades (not shown) to adjust the amount of light projected on the photographing area of the photographic film. The aperture blades 21 to 23 in the present embodiment are used to darken the periphery of the photographing area of the photographic film, and are different from the aperture blades (not shown) used to adjust the amount of light projected on the photographing area.

Figure 3:
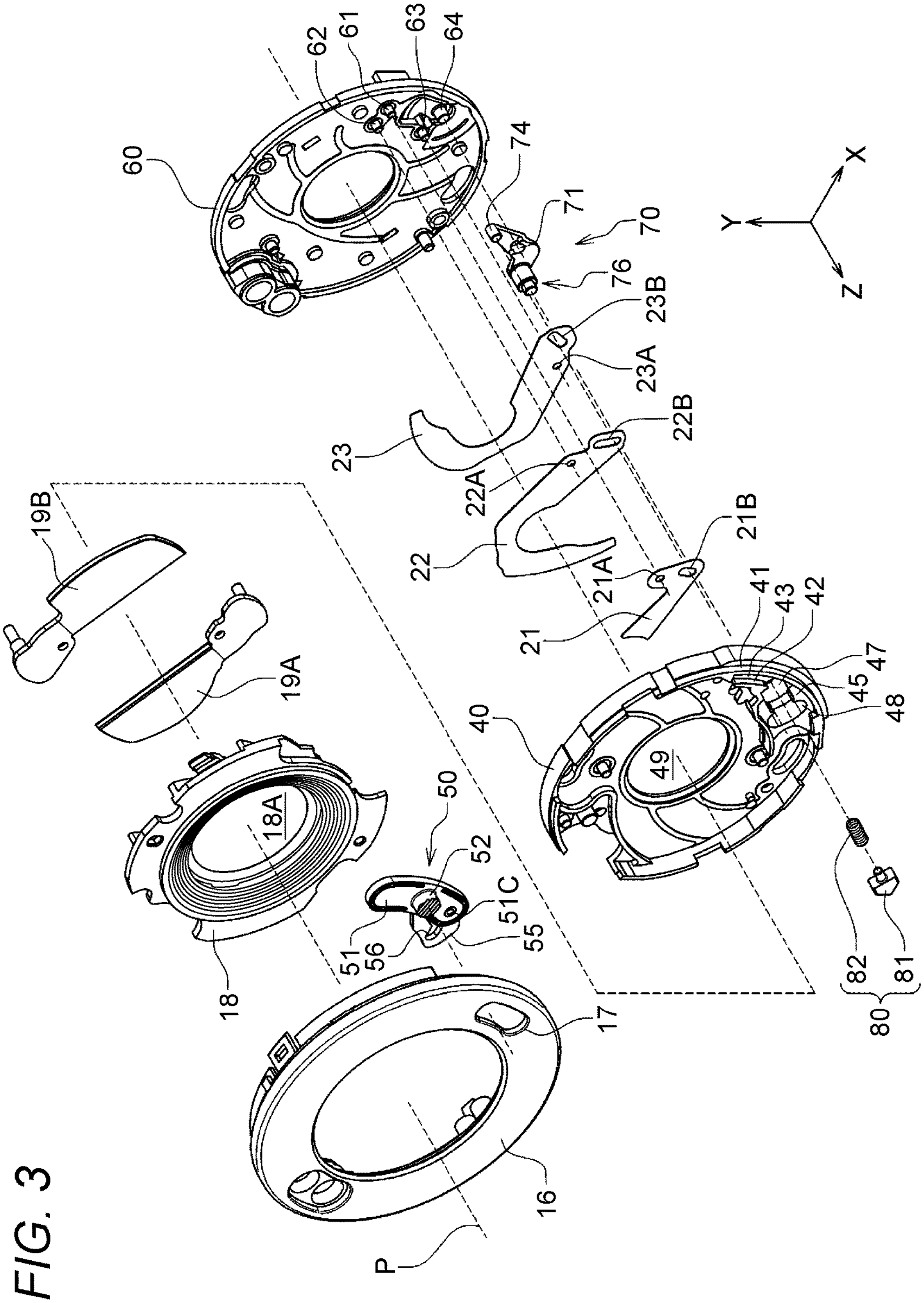
FIG. 3 is an exploded perspective view of some of the components of the inner cylinder shown in FIG. 2.

FIG. 3 is an exploded perspective view of some of the components of the inner cylinder 12. As shown in FIG. 3, the inner cylinder 12 includes a first base plate 40 (base) with a substantially disk shape, a front panel 18 located between the first base plate 40 and the cover plate 16, a pair of barrier blades 19A and 19B located in a space between the first base plate 40 and the front panel 18, an operation lever 50 located between the first base plate 40 and the cover plate 16, a second base plate 60 located behind the first base plate 40, an actuation lever 70 located in a space between the first base plate 40 and the second base plate 60, and a pusher 80 that applies a force to the actuation lever 70. The aperture blades 21 to 23 are located in the space between the first base plate 40 and the second base plate 60. The second base plate 60 includes shafts 61 to 64 extending in the positive Z-direction.

Before photographing, as shown in FIG. 1, the barrier blades 19A and 19B are in contact with each other to block external light entering a lens (not shown) in the inner cylinder 12. During photographing, the barrier blades 19A and 19B are moved away from each other by a drive (not shown) to allow external light to enter the lens inside the inner cylinder 12 through an opening 18A of the front panel 18. FIGS. 2 and 3 show the structure during photographing in which the barrier blades 19A and 19B are spaced apart from each other.

Figure 4:
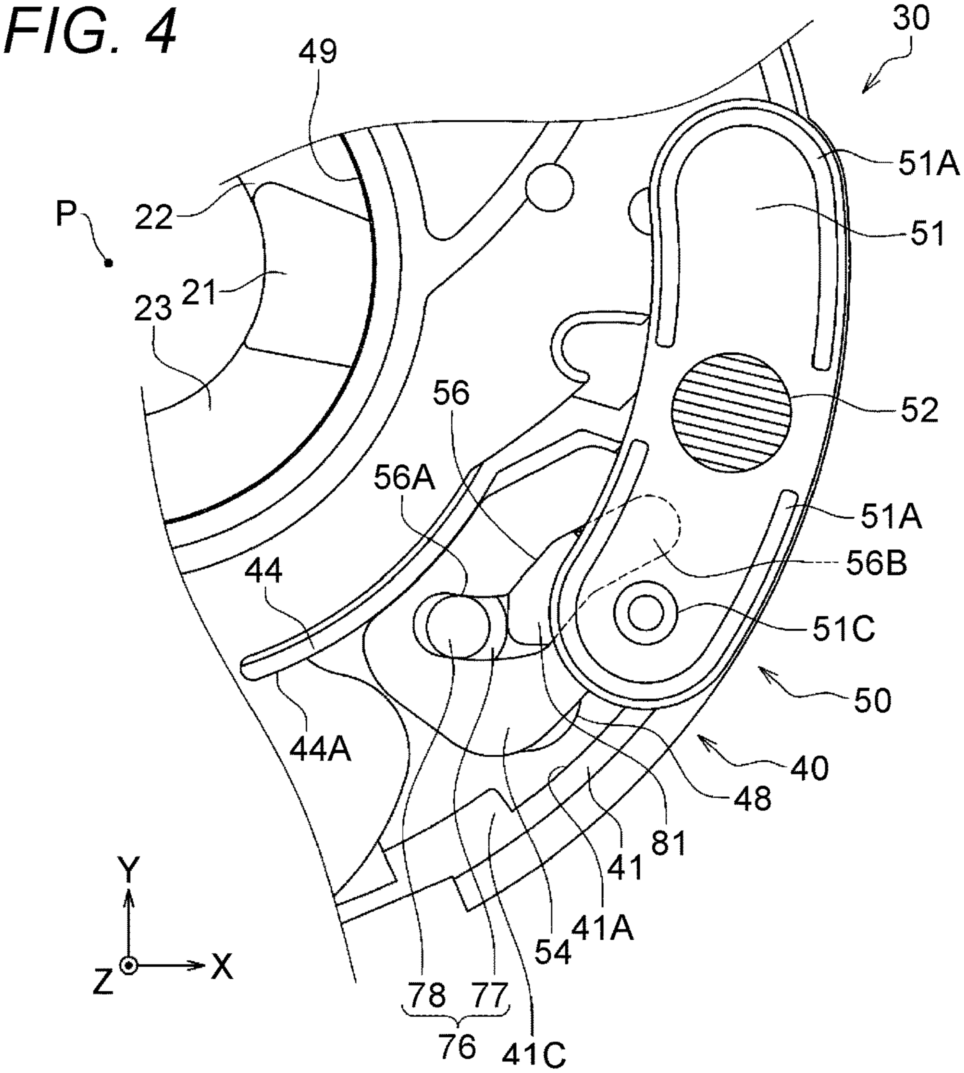
FIG. 4 is a plan view of a part of the inner cylinder shown in FIG. 2, showing the components of a switch.

The switch 30 according to the present embodiment includes a part of the first base plate 40, the operation lever 50, the actuation lever 70, and the pusher 80. FIG. 4 is a plan view of the components included in the switch 30, among the components in the inner cylinder 12 in FIG. 2. As shown in FIG. 4, the operation lever 50 in the switch 30 is located near the periphery of the first base plate 40. As described later, the operation lever 50 is movable in a circumferential direction about an optical axis P (first axis) through a user operation.

Figure 5A:
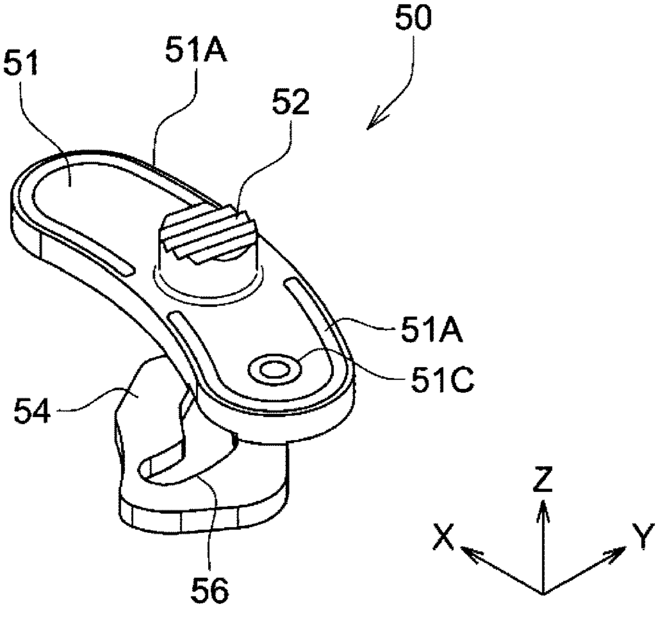
FIG. 5A is a perspective view of an operation lever in the inner cylinder shown in FIG. 3.
Figure 5B:
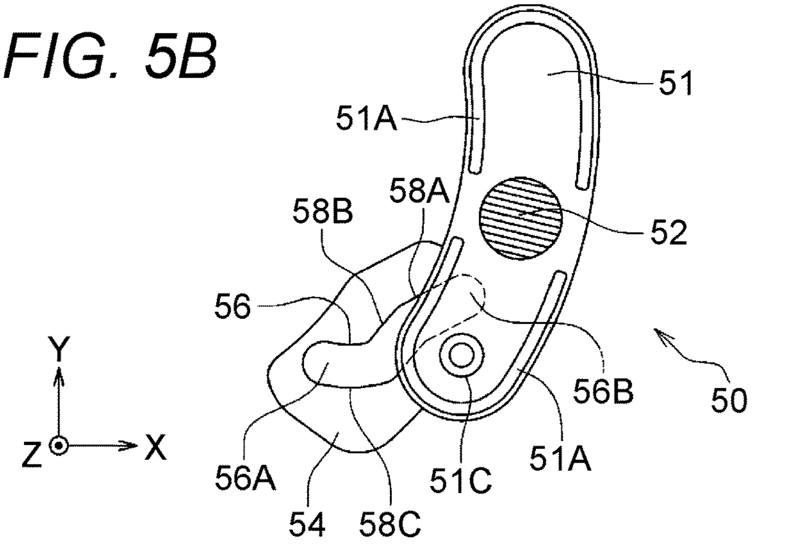
FIG. 5B is a plan view of the operation lever shown in FIG. 5A.
Figure 5C:
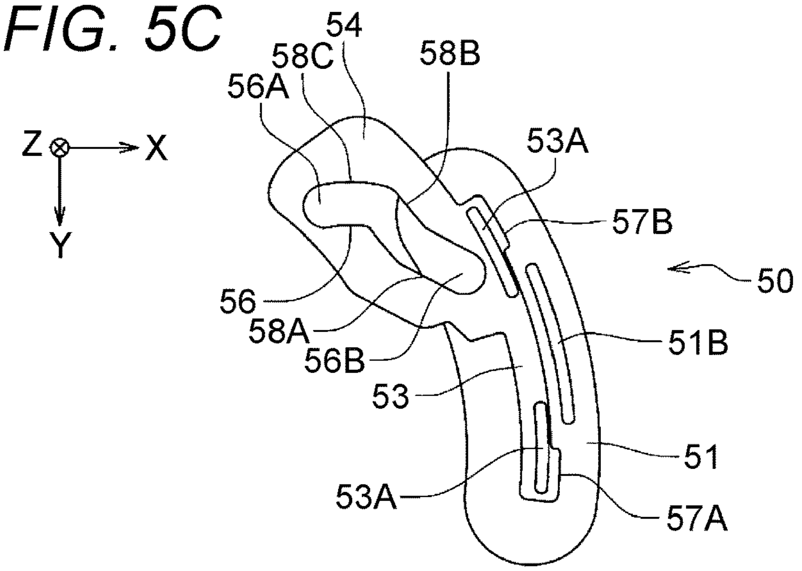
FIG. 5C is a bottom view of the operation lever shown in FIG. 5A.

FIG. 5A is a perspective view of the operation lever 50. FIG. 5B is a plan view of the operation lever 50. FIG. 5C is a bottom view of the operation lever 50. As shown in FIGS. 4 and 5A to 5C, the operation lever 50 includes an arc plate 51 extending along an arc about the optical axis P with the operation lever 50 located on the first base plate 40, an operation projection 52 protruding from the arc plate 51 in the positive Z-direction, a rail 53 extending along an arc in the same manner as the arc plate 51 on the surface of the arc plate 51 in the negative Z-direction, and a plate-like extension 54 extending from the rail 53. The operation projection 52 has, on its distal end, protrusions and recesses to facilitate operation of the operation lever 50.

The arc plate 51 includes a ridge 51A raised on the front surface in the positive Z-direction, and a ridge 51B raised on the rear surface in the negative Z-direction. The ridge 51A is in contact with the cover plate 16 to reduce friction between the operation lever 50 and the cover plate 16. The ridge 51B is in contact with the first base plate 40 to reduce friction between the operation lever 50 and the first base plate 40. The arc plate 51 has a mark 51C on the front surface to indicate that the aperture blades 21 to 23 are at the minimum aperture position.

As shown in FIG. 3, the cover plate 16 located in front of the operation lever 50 has a window 17 elongated in an arc shape. As shown in FIG. 1, the operation projection 52 on the operation lever 50 is received in the window 17. At the position in FIG. 1, or more specifically, when the aperture blades 21 to 23 are at the minimum aperture position, the mark 51C on the arc plate 51 is viewable from outside through the window 17 in the cover plate 16. As described later, when the operation lever 50 is moved in the circumferential direction (when the aperture blades 21 to 23 are at the maximum aperture position), the mark 51C is hidden behind the cover plate 16. Thus, when recognizing the mark 51C on the operation lever 50, the user can recognize the aperture blades 21 to 23 at the minimum aperture position.

As shown in FIG. 5C, the rail 53 on the operation lever 50 includes thick portions 57A and 57B at both ends. The thick portions 57A and 57B protrude radially outward. The rail 53 further includes a ridge 53A raised on the rear surface in the negative Z-direction. The ridge 53A is in contact with the first base plate 40 to reduce friction between the operation lever 50 and the first base plate 40.

As shown in FIGS. 4 and 5A to 5C, the extension 54 on the operation lever 50 has a cam slot 56. The cam slot 56 has an inner portion 56A located radially inward toward the optical axis P, and an outer portion 56B located radially outward from the inner portion 56A with respect to the optical axis P. The cam slot 56 fully extends in the circumferential direction between the inner portion 56A and the outer portion 56B. As described later, the cam slot 56 is shaped based on the relationship between the rotation angle of the actuation lever 70 and a force applied from the pusher 80 to the actuation lever 70.

Referring back to FIG. 3, the aperture blade 21 has a circular hole 21A and an elongated hole 21B, the aperture blade 22 has a circular hole 22A and an elongated hole 22B, and the aperture blade 23 has a circular hole 23A and an elongated hole 23B. The circular hole 21A in the aperture blade 21 receives the shaft 61 on the second base plate 60. The aperture blade 21 is thus rotatable about the shaft 61, which is received in the circular hole 21A in the aperture blade 21. Similarly, the circular hole 22A in the aperture blade 22 receives the shaft 62 on the second base plate 60. Thus, the aperture blade 22 is rotatable about the shaft 62. The circular hole 23A in the aperture blade 23 receives the shaft 63 on the second base plate 60. Thus, the aperture blade 23 is rotatable about the shaft 63.

Figure 6:
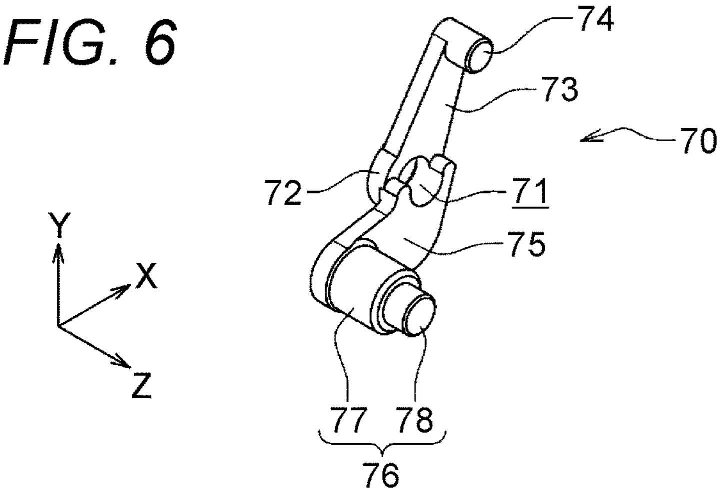
FIG. 6 is a perspective view of an actuation lever shown in FIG. 3.

FIG. 6 is a perspective view of the actuation lever 70. As shown in FIG. 6, the actuation lever 70 includes an axial portion 72 having an axial hole 71 extending through in Z-direction, a first arm 73 extending from the axial portion 72, a cylindrical actuation portion 74 extending from an end of the first arm 73 in the positive Z-direction, a second arm 75 extending from the axial portion 72 in a direction different from the direction in which the first arm 73 extends, and a follower 76 extending from an end of the second arm 75 in the positive Z-direction. The axial hole 71 in the axial portion 72 receives the shaft 64 (refer to FIG. 3) on the second base plate 60. The actuation lever 70 receiving the shaft 64 in the axial hole 71 in the axial portion 72 is rotatable about the shaft 64 (second axis). The follower 76 includes a larger-diameter portion 77 with a relatively larger diameter, and a smaller-diameter portion 78 located in the positive Z-direction from the larger-diameter portion 77 and having a smaller diameter than the larger-diameter portion 77.

The actuation portion 74 on the actuation lever 70 is received in the elongated holes 21B to 23B in the aperture blades 21 to 23. The actuation portion 74 has an outer diameter slightly smaller than the width of the elongated holes 21B to 23B (the dimension perpendicular to the direction along the elongated holes 21B to 23B) to be movable in the elongated holes 21B to 23B in the aperture blades 21 to 23 while being engaged with the elongated holes 21B to 23B. In response to the actuation lever 70 rotating about the shaft 64, the actuation portion 74 applies a force to the aperture blades 21 to 23 while moving in the elongated holes 21B to 23B in the aperture blades 21 to 23, rotating the aperture blades 21 to 23 about the shafts 61 to 63 through the engagement with the elongated holes 21B to 23B. The aperture blades 21 to 23 are connected to the actuation lever 70 with the actuation portion 74 as described above, and rotate about the shafts 61 to 63 (rotation axes) as the actuation lever 70 rotates.

Figure 7:
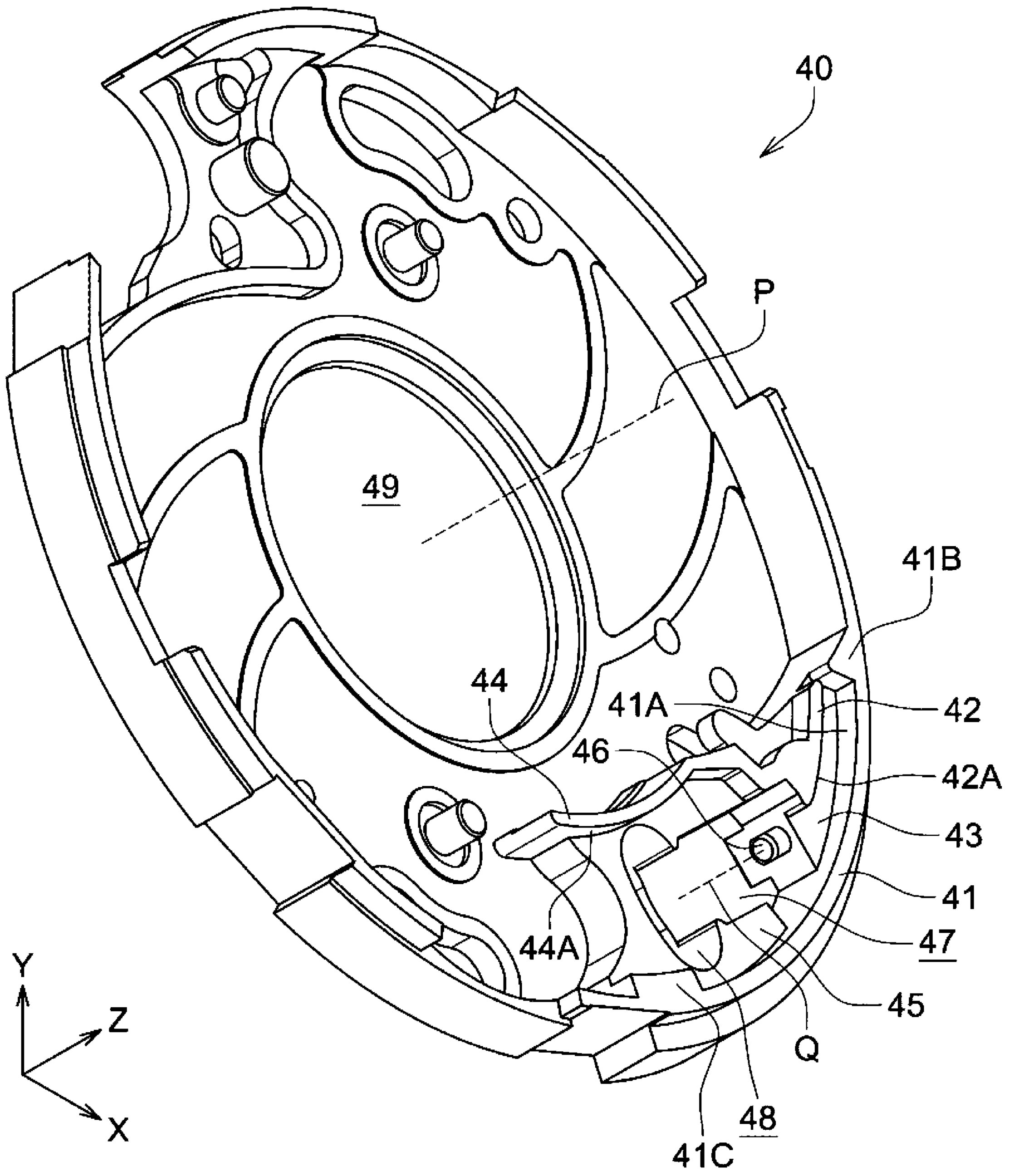
FIG. 7 is a perspective view of a first base plate shown in FIG. 3.

FIG. 7 is a perspective view of the first base plate 40. As shown in FIGS. 4 and 7, the first base plate 40 includes an outer wall 41 having an inner circumferential surface 41A extending along an arc about the optical axis P (first axis), a first inner wall 42 having an outer circumferential surface 42A extending along an arc about the optical axis P and located radially inward from the outer wall 41, a first support 43 located between the outer wall 41 and the first inner wall 42, a second inner wall 44 having an outer circumferential surface 44A extending along an arc about the optical axis P and located radially inward from the first inner wall 42, a second support 45 located between the outer wall 41 and the second inner wall 44, and a spring fixture 46 protruding from the first support 43 along an axis Q (third axis) perpendicular to the optical axis P. The first base plate 40 has an opening 49 at the center. The outer wall 41 includes stoppers 41B and 41C protruding radially inward from the inner circumferential surface 41A.

The second support 45 has an arc slot 48 elongated along an arc about the shaft 64 on the second base plate 60. The arc slot 48 receives the follower 76 on the actuation lever 70 shown in FIG. 6 placed from the rear of the first base plate 40 (from a position in the negative Z-direction). In response to the actuation lever 70 rotating about the shaft 64, the follower 76 moves along the arc slot 48.

The first support 43 and the second support 45 have the same dimension in Z-direction. A recess 47 is defined between the first support 43 and the second support 45. The spring fixture 46 is located in the recess 47.

The operation lever 50 is located in the positive Z-direction from the first support 43 and the second support 45. More specifically, the operation lever 50 is located in the positive Z-direction from the first base plate 40 with a part of the rail 53 on the operation lever 50 aligned with the first support 43 in the positive Z-direction, and another part of the rail 53 and the extension 54 on the operation lever 50 aligned with the second support 45 in the positive Z-direction.

Figure 8:
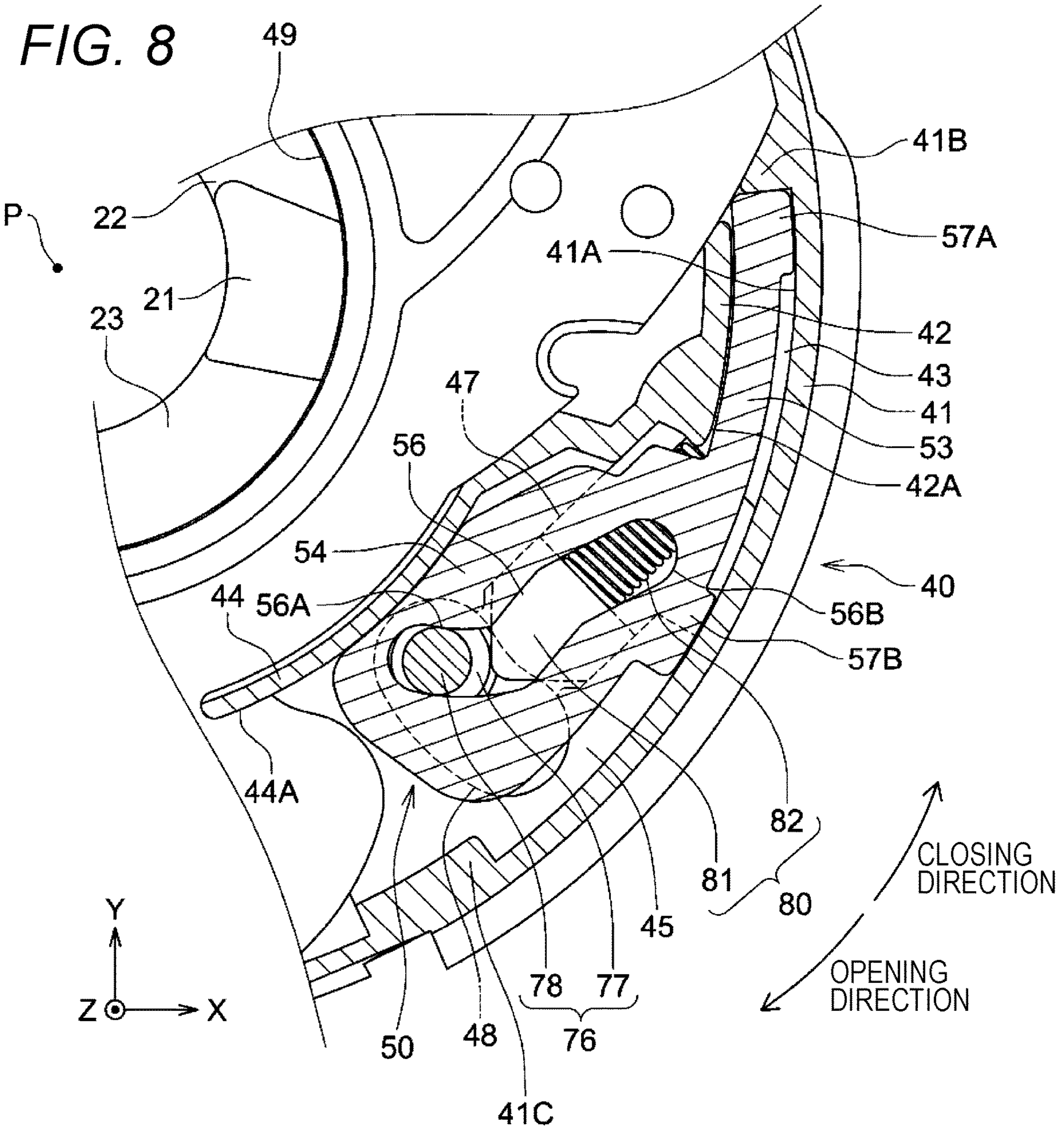
FIG. 8 is a partial cross-sectional view of the operation lever, the first base plate, and the actuation lever taken along a plane perpendicular to an optical axis to include a rail and an extension on the operation lever shown in FIG. 3.

FIG. 8 is a partial cross-sectional view of the operation lever 50, the first base plate 40, and the actuation lever 70 taken along a plane perpendicular to the optical axis P to include the rail 53 and the extension 54 on the operation lever 50. As shown in FIGS. 4 and 8, the larger-diameter portion 77 of the follower 76 on the actuation lever 70 is received in the arc slot 48 in the first base plate 40, and the smaller-diameter portion 78 of the follower 76 protrudes from the arc slot 48 in the positive Z-direction and is received in the cam slot 56 in the operation lever 50, which is located in the positive Z-direction from the second support 45.

The smaller-diameter portion 78 of the follower 76 on the actuation lever 70 has an outer diameter slightly smaller than the width (dimension perpendicular to the direction along the cam slot 56) of the cam slot 56 in the operation lever 50, and thus is movable along the cam slot 56 in the operation lever 50 while being engaged with the cam slot 56.

As shown in FIG. 8, the thick portion 57A of the rail 53 on the operation lever 50 is held between the inner circumferential surface 41A of the outer wall 41 and the outer circumferential surface 42A of the first inner wall 42 in the first base plate 40, and guided along the inner circumferential surface 41A of the outer wall 41 and the outer circumferential surface 42A of the first inner wall 42. The thick portion 57B of the rail 53 on the operation lever 50 is in contact with the inner circumferential surface 41A of the outer wall 41 in the first base plate 40, and the extension 54 is in contact with the outer circumferential surface 44A of the second inner wall 44. More specifically, the extension 54 and the thick portion 57B of the operation lever 50 are held between the inner circumferential surface 41A of the outer wall 41 and the outer circumferential surface 44A of the second inner wall 44 in the first base plate 40, and guided along the inner circumferential surface 41A of the outer wall 41 and the outer circumferential surface 44A of the second inner wall 44. This structure allows the operation lever 50 to move in the circumferential direction about the optical axis P. In FIG. 8, the direction in which the operation lever 50 moves clockwise about the optical axis P is hereafter referred to as an opening direction, and the direction in which the operation lever 50 moves counterclockwise about the optical axis P as a closing direction.

As shown in FIG. 8, the recess 47 between the first support 43 and the second support 45 on the first base plate 40 accommodates the pusher 80. The pusher 80 includes a contact 81 movable in the recess 47 along the axis Q (refer to FIG. 7), and a coil spring 82 serving as an urging member that urges the contact 81 along the axis Q.

Figure 9:
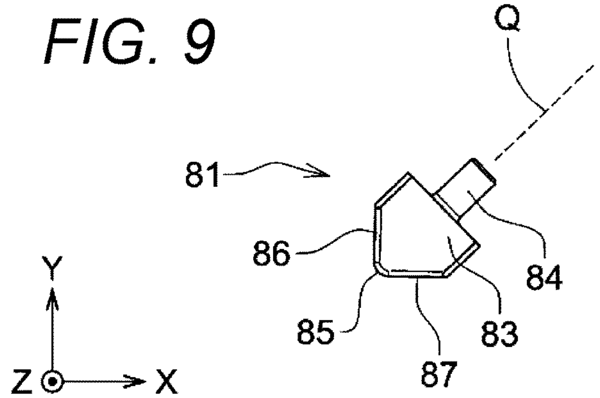
FIG. 9 is a plan view of a contact shown in FIG. 3.

FIG. 9 is a plan view of the contact 81. As shown in FIG. 9, the contact 81 includes a contact body 83 with a pentagonal prism shape, and a spring fixture 84 extending from the contact body 83 along the axis Q. The contact body 83 includes a rounded apex 85, and slopes 86 and 87 extending in two directions from the apex 85. The apex 85 and the slopes 86 and 87 of the contact body 83 come in contact with the larger-diameter portion 77 of the follower 76 on the actuation lever 70 received in the arc slot 48.

The coil spring 82 has a first end through which the spring fixture 84 on the contact 81 is placed, and a second end through which the spring fixture 46 (refer to FIG. 7) on the first base plate 40 is placed. Thus, the coil spring 82 is fixed between the contact body 83 and the first support 43 on the first base plate 40 while being compressed. The contact 81 is urged by the coil spring 82 along the axis Q. Thus, either the apex 85 or the slopes 86 and 87 come in contact with the larger-diameter portion 77 of the follower 76 on the actuation lever 70 to push the follower 76.

Figure 10A:
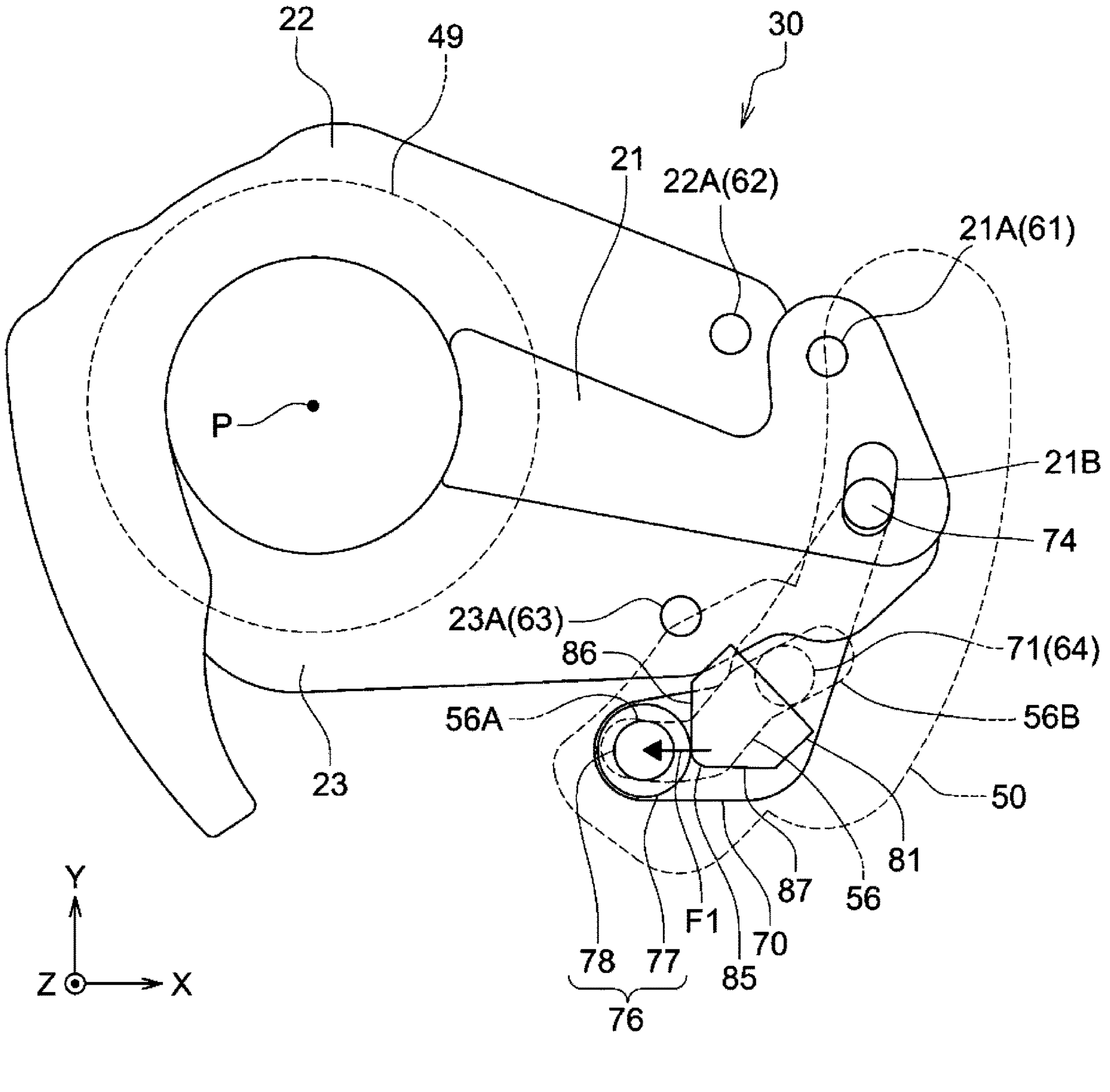
FIG. 10A is a schematic diagram showing the relationship between the components of the inner cylinder shown in FIG. 2 with aperture blades at a minimum aperture position.
Figure 10B:
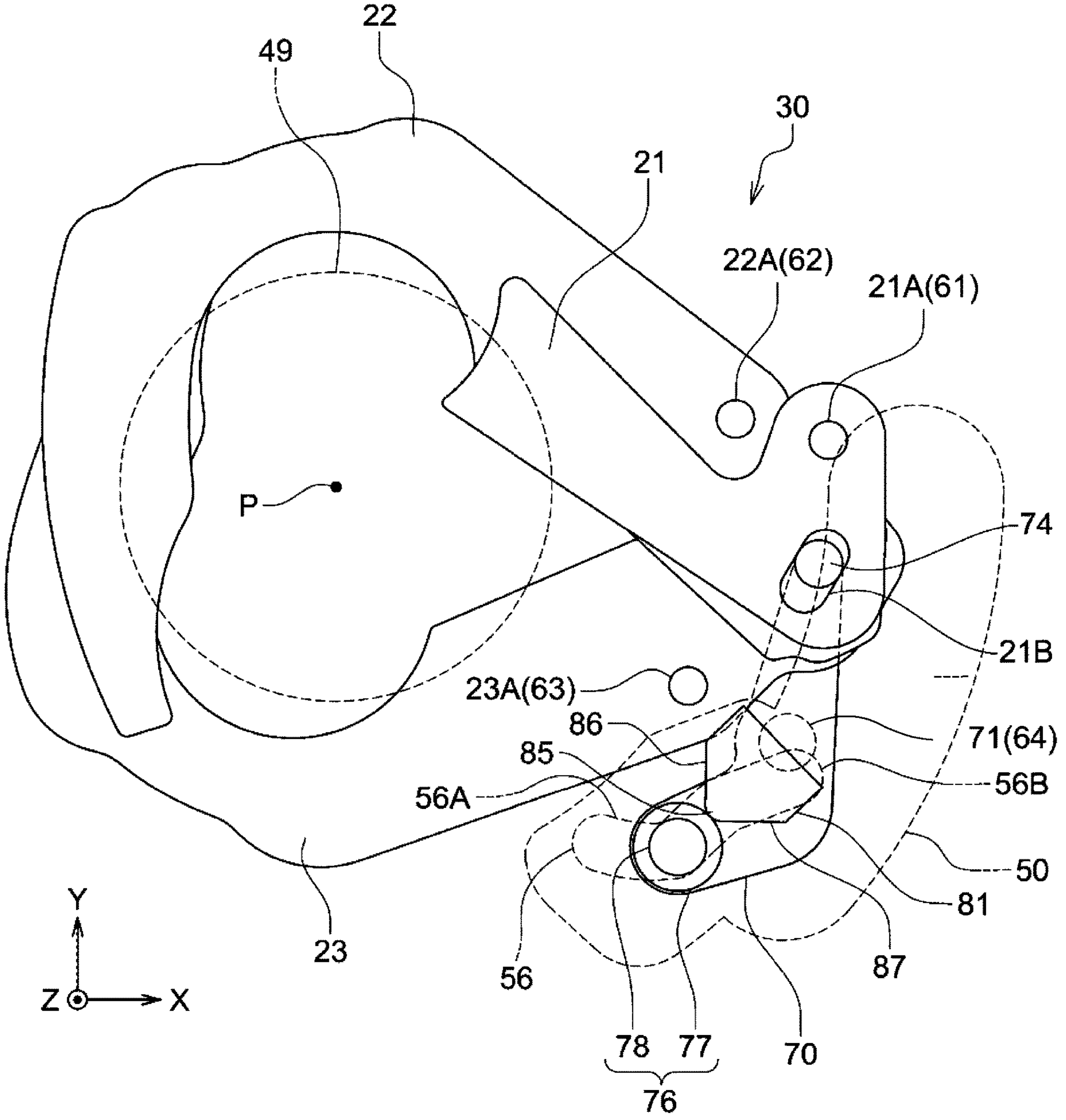
FIG. 10B is a schematic diagram showing the relationship between the components of the inner cylinder shown in FIG. 2 with the aperture blades between the minimum aperture position and a maximum aperture position.
Figure 10C:
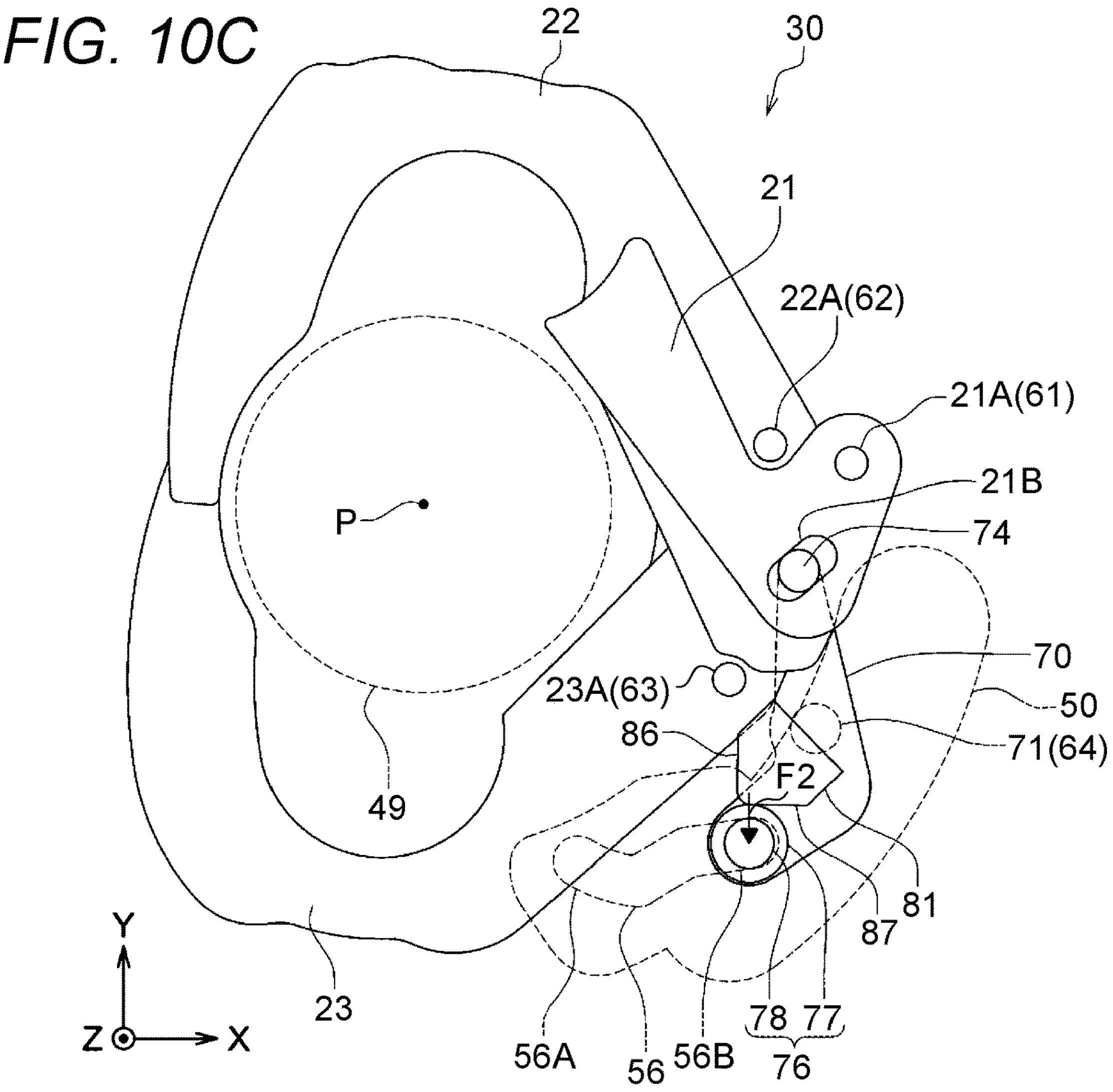
FIG. 10C is a schematic diagram showing the relationship between the components of the inner cylinder shown in FIG. 2 with the aperture blades at the maximum aperture position.

FIGS. 10A to 10C are schematic diagrams showing the relationship between the components of the switch 30 at different positions. FIG. 10A shows the aperture blades 21 to 23 switched to the minimum aperture position by the switch 30, or more specifically, when the switch 30 is at the position in FIGS. 4 and 8. FIG. 10B shows the aperture blades 21 to 23 being switched by the switch 30 from the minimum aperture position toward the maximum aperture position or from the maximum aperture position toward the minimum aperture position. FIG. 10C shows the aperture blades 21 to 23 switched by the switch 30 to the maximum aperture position. As shown in FIGS. 10A and 10C, the maximum aperture position of the aperture blades 21 to 23 is outward from the minimum aperture position of the aperture blades 21 to 23 in the radial direction.

As shown in FIG. 10A, at the minimum aperture position, the aperture blades 21 to 23 partially extend inward from the edge of the opening 49 in the first base plate 40 to block light beams entering the lens inside the inner cylinder 12. The aperture blades 21 to 23 extending inward generate vignetting at the periphery of the photographing area of the photographic film and darken the periphery of an image to be captured. This allows capturing of a photograph with either or both of aesthetic and artistic effects to further highlight the center, or more specifically, a photograph with vignetting effects. In this state, the smaller-diameter portion 78 of the follower 76 on the actuation lever 70 is received in the inner portion 56A of the cam slot 56 in the operation lever 50. The position of the actuation lever 70 in this state is referred to as a first actuation lever position, and the position of the follower 76 in this state is referred to as a first follower position.

When the user operates the operation projection 52 (refer to FIG. 1) on the operation lever 50 received in the window 17 in the cover plate 16 to move the operation lever 50 in the opening direction from the position in FIG. 10A, the smaller-diameter portion 78 of the follower 76 engaged with the cam slot 56 moves along the cam slot 56 in the operation lever 50, and the actuation lever 70 rotates counterclockwise about the shaft 64. As described above, the actuation portion 74 on the actuation lever 70 is engaged with the elongated holes 21B to 23B in the aperture blades 21 to 23. Thus, in response to the actuation lever 70 rotating counterclockwise, the aperture blade 21 rotates clockwise about the shaft 61, the aperture blade 22 rotates clockwise about the shaft 62, and the aperture blade 23 rotates counterclockwise about the shaft 63.

As shown in FIG. 10A, with the follower 76 on the actuation lever 70 at the first follower position, the larger-diameter portion 77 of the follower 76 is in contact with the slope 86 of the contact 81. As described above, the contact 81 is urged by the coil spring 82. Thus, the follower 76 is pushed by the slope 86 of the contact 81 to rotate clockwise about the shaft 64 (refer to arrow F1). The smaller-diameter portion 78 of the follower 76 is engaged with the cam slot 56 in the operation lever 50. In response to the follower 76 being pushed to rotate clockwise, a force is applied to the operation lever 50 in the closing direction. Under no external force on the operation lever 50, a force is applied from the coil spring 82 to the operation lever 50 in the closing direction. The thick portion 57A of the rail 53 on the operation lever 50 thus abuts against the stopper 41B (refer to FIG. 8) on the first base plate 40, retaining the operation lever 50 in position in the circumferential direction. The stopper 41B on the first base plate 40 thus restricts movement of the operation lever 50 in the closing direction. The position of the operation lever 50 in this state is referred to as a first operation lever position.

At the position in FIG. 10A, a force is applied from the coil spring 82 to the operation lever 50 in the closing direction as described above. To move the operation lever 50 in the opening direction, the user applies, to the operation lever 50, a force exceeding the force from the coil spring 82 in the closing direction. When the user applies a force exceeding the force from the coil spring 82 to the operation lever 50 in the closing direction to move the operation lever 50 in the opening direction from the position in FIG. 10A, a position of contact between the contact 81 and the larger-diameter portion 77 of the follower 76 on the actuation lever 70 changes from the slope 86 toward the apex 85.

FIG. 10B shows the position of contact between the contact 81 and the larger-diameter portion 77 of the follower 76 changed to the apex 85. The position of the follower 76 in this state is referred to as a reference follower position. The follower 76 in the reference follower position is located on the axis Q, and the coil spring 82 at this position applies no moment to the actuation lever 70.

When the user moves the operation lever 50 further in the closing direction from the position in FIG. 10B, as described above, the smaller-diameter portion 78 of the follower 76 moves along the cam slot 56 in the operation lever 50. The actuation lever 70 thus rotates counterclockwise about the shaft 64, and the aperture blades 21 to 23 rotate to the maximum aperture position illustrated in FIG. 10C about the actuation portion 74 on the actuation lever 70.

As shown in FIG. 10C, at the maximum aperture position, the aperture blades 21 to 23 are located outside the edge of the opening 49 in the first base plate 40 to unblock light beams entering the lens inside the inner cylinder 12. In this state, the smaller-diameter portion 78 of the follower 76 on the actuation lever 70 is received in the outer portion 56B of the cam slot 56 in the operation lever 50. The position of the actuation lever 70 in this state is referred to as a second actuation lever position, and the position of the follower 76 is referred to as a second follower position.

As shown in FIG. 10C, with the follower 76 on the actuation lever 70 at the second follower position, the larger-diameter portion 77 of the follower 76 is in contact with the slope 87 of the contact 81. As described above, the contact 81 is urged by the coil spring 82. Thus, the follower 76 is pushed by the slope 87 of the contact 81 to rotate counterclockwise about the shaft 64 (refer to arrow F2). The smaller-diameter portion 78 of the follower 76 is engaged with the cam slot 56 in the operation lever 50. In response to the follower 76 being pushed to rotate counterclockwise, a force is applied to the operation lever 50 in the opening direction. Under no external force on the operation lever 50, a force is applied from the coil spring 82 to the operation lever 50 in the opening direction. The thick portion 57B of the rail 53 on the operation lever 50 thus abuts against the stopper 41C (refer to FIG. 8) on the first base plate 40, retaining the operation lever 50 in position in the circumferential direction. The stopper 41C on the first base plate 40 thus restricts movement of the operation lever 50 in the opening direction. The position of the operation lever 50 in this state is referred to as a second operation lever position.

As described above, to move the operation lever 50 in the opening direction from the first operation lever position shown in FIG. 10A, the user applies, to the operation lever 50, a force exceeding the force from the coil spring 82 in the closing direction. When the larger-diameter portion 77 of the follower 76 moves over the apex 85 from the slope 86 of the contact 81 to come in contact with the slope 87, a force is applied from the coil spring 82 to the operation lever 50 in the opening direction. Thus, the operation lever 50 moves to the second operation lever position shown in FIG. 10C without the user applying a force to the operation lever 50. The user can feel such a change (click) in a force acting on the operation lever 50.

When the user moves the operation lever 50 in the closing direction from the second operation lever position in FIG. 10C, the smaller-diameter portion 78 of the follower 76 moves along the cam slot 56 in the operation lever 50. The actuation lever 70 thus rotates clockwise about the shaft 64, and the aperture blades 21 to 23 rotate about the actuation portion 74 on the actuation lever 70. In this state, a force is applied from the coil spring 82 to the operation lever 50 in the opening direction in the above manner. Thus, to move the operation lever 50 in the closing direction, the user applies a force exceeding the force from the coil spring 82 to the operation lever 50 in the opening direction until the larger-diameter portion 77 of the follower 76 moves over the apex 85 of the contact 81. After the larger-diameter portion 77 of the follower 76 moves over the apex 85 of the contact 81, a force is applied from the coil spring 82 to the operation lever 50 in the closing direction. Thus, the operation lever 50 moves to the first operation lever position in FIG. 10A without the user applying a force to the operation lever 50. In this state as well, the user can feel a change (click) in a force acting on the operation lever 50.

In the present embodiment, as described above, the slope 86 of the contact 81 serves as a first contact portion that comes in contact with the larger-diameter portion 77 of the follower 76 located closer to the first follower position than to the reference follower position. When urged by the coil spring 82, the slope 86 pushes the follower 76 to rotate the follower 76 clockwise about the shaft 64. The slope 87 of the contact 81 serves as a second contact portion that comes in contact with the larger-diameter portion 77 of the follower 76 located closer to the second follower position than to the reference follower position. When urged by the coil spring 82, the slope 87 pushes the follower 76 to rotate the follower 76 counterclockwise about the shaft 64.

In the present embodiment, the slopes 86 and 87 of the contact 81 are symmetric to each other with respect to the apex 85, but are not limited to this structure. In the present embodiment, with the slopes 86 and 87 being symmetric to each other with respect to the apex 85, a force is similarly applied to the operation lever 50 when the operation lever 50 is moved from the first operation lever position in the opening direction (opening operation) and from the second operation lever position in the closing direction (closing operation). Thus, the structure in the present embodiment allows these operations to be performed in a well-balanced manner. In the present embodiment, as described above, the reference follower position is located on the axis Q. Thus, the opening operation and the closing operation can be performed in a well-balanced manner.

When the user operates the operation lever 50 in the switch 30 in the camera 1 according to the present embodiment, the aperture blades 21 to 23 can be moved between the minimum aperture position and the maximum aperture position. With the aperture blades 21 to 23 moved to the minimum aperture position, vignetting occurs at the periphery of the photographing area of the photographic film, and the periphery of the image to be captured is darkened. This allows capturing of a photograph with either or both of aesthetic and artistic effects to further highlight the center, or more specifically, a photograph with vignetting effects. As described above, a digital photograph may undergo data modification to add such vignetting effects to the image after being captured. However, an analogue photograph cannot undergo such post-edition on the image. Thus, a camera for capturing analogue photographs that can add vignetting effects can be highly useful.

When located closer to the first follower position than to the reference follower position, the follower 76 on the actuation lever 70 is pushed by the contact 81 toward the first follower position. When located closer to the second follower position than to the reference follower position, the follower 76 is pushed by the contact 81 toward the second follower position. Thus, the aperture blades 21 to 23 can be easily switched with the larger-diameter portion 77 of the follower 76 on the actuation lever 70 being moved across the reference follower position through the movement of the operation lever 50. Thus, the aperture blades 21 to 23 have simple structures. The user can feel a change in a force applied to the operation lever 50 from the contact 81, or in other words, feel a click before and after the follower 76 on the actuation lever 70 moves over the reference follower position.

The shape of the cam slot 56 in the operation lever 50 will be described. The cam slot 56 in the operation lever 50 in the present embodiment is shaped to have the relationship between the rotation angle of the actuation lever 70 about the shaft 64 when the follower 76 in the actuation lever 70 moves from the first follower position toward the reference follower position and a push distance of the contact 81 along the axis Q being equal to the relationship between the rotation angle of the actuation lever 70 about the shaft 64 when the follower 76 moves from the second follower position toward the reference follower position and the push distance of the contact 81 along the axis Q. The cam slot 56 with such a shape allows the user to move, with the same force, the operation lever 50 from the first operation lever position in the opening direction (to perform an opening operation) and from the second operation lever position in the closing direction (to perform a closing operation). Thus, the user can operate the operation lever 50 with improved operability.

Figure 11:
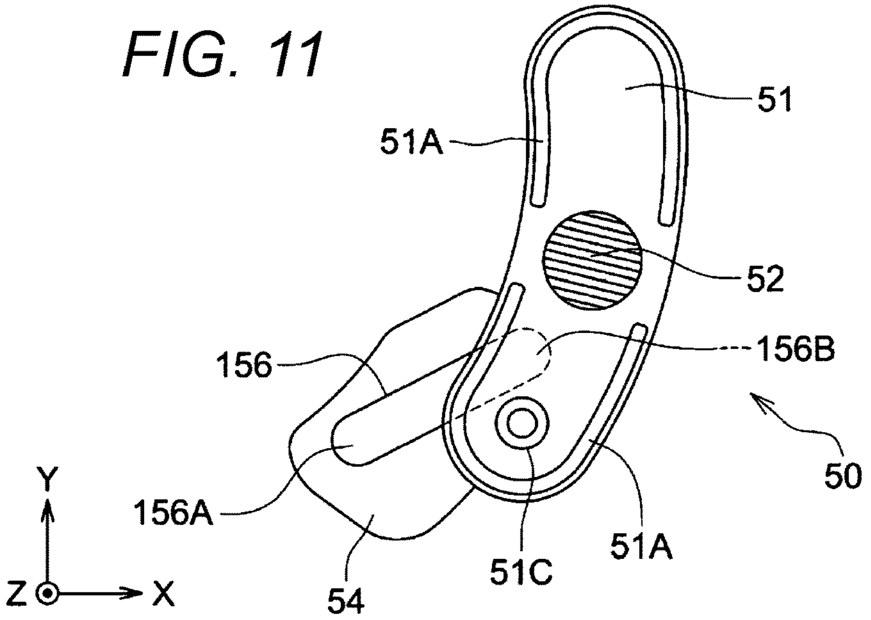
FIG. 11 is a plan view of an operation lever according to another embodiment of the present invention.
Figure 12:
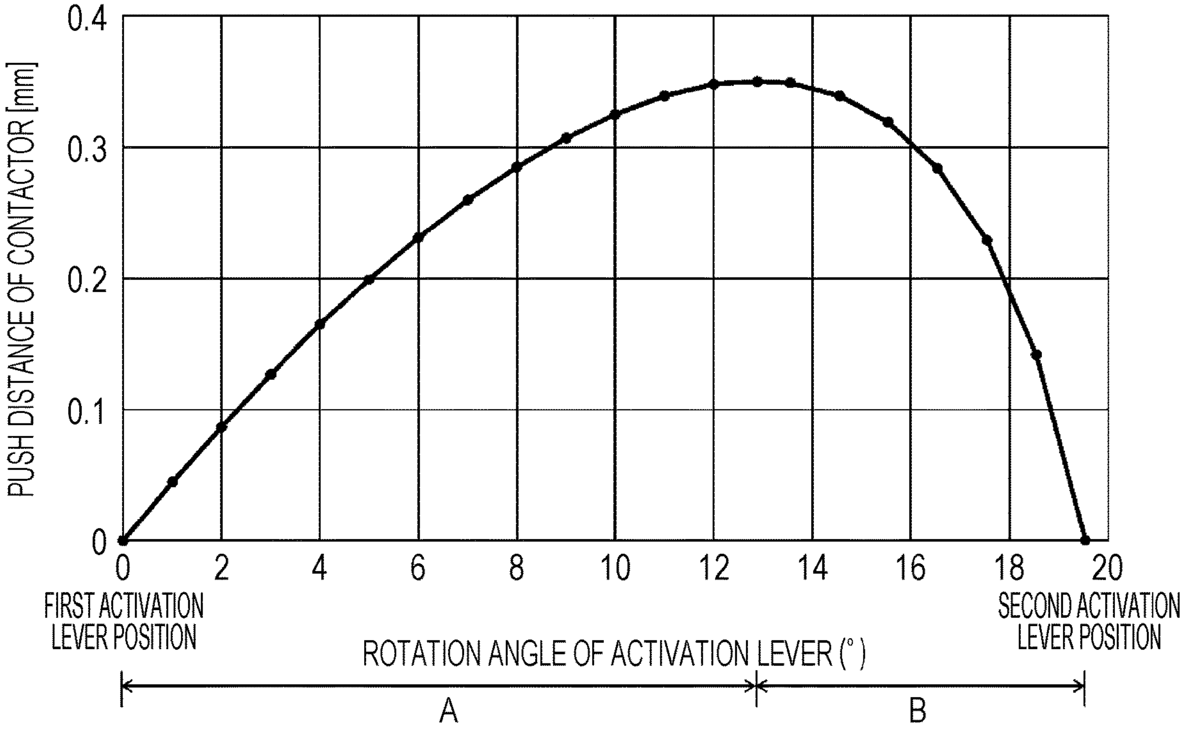
FIG. 12 is a graph showing the relationship between the rotation angle of the actuation lever and a moving distance of the contact when the operation lever shown in FIG. 11 is used.

For example, a cam slot in the operation lever 50 may be a cam slot 156 elongated linearly from an inner portion 156A to an outer portion 156B as shown in FIG. 11. FIG. 12 shows the relationship, defined by simulation, between the rotation angle of the actuation lever 70 from the first actuation lever position and the push distance of the contact 81 along the axis Q when the smaller-diameter portion 78 of the follower 76 on the actuation lever 70 moves along the cam slot 156.

For the cam slot 156 extending linearly, as shown in FIG. 12, when the actuation lever 70 rotates from the first actuation lever position toward the second actuation lever position (opening operation of the operation lever 50), the push distance of the contact 81 increases gradually (area A), and a force applied from the coil spring 82 to the actuation lever 70 and the operation lever 50 also increases gradually. In contrast, when the actuation lever 70 rotates from the second actuation lever position toward the first actuation lever position (closing operation of the operation lever 50), the push distance of the contact 81 increases steeply (area B), and a force applied from the coil spring 82 to the actuation lever 70 and the operation lever 50 also increases steeply. This means a difference in a force of operating the operation lever 50 between the opening operation and the closing operation of the operation lever 50, and a difference in the operability of the operation lever 50.

The cam slot 56 described above is obtained by improving the shape of the cam slot 156 to operate the operation lever 50 with the same operability in any operations without causing such a difference in force. More specifically, as shown in FIGS. 5B and 5C, the cam slot 56 has a first slot 58A elongated along a line connecting the inner portion 56A and the outer portion 56B, a second slot 58B connecting with the first slot 58A and elongated to have a smaller radial change with respect to the circumferential direction than the first slot 58A, and a third slot 58C connecting with the second slot 58B and elongated to have a greater radial change with respect to the circumferential direction than the first slot 58A and the second slot 58B. The first slot 58A matches a part of the cam slot 156.

Figure 13:
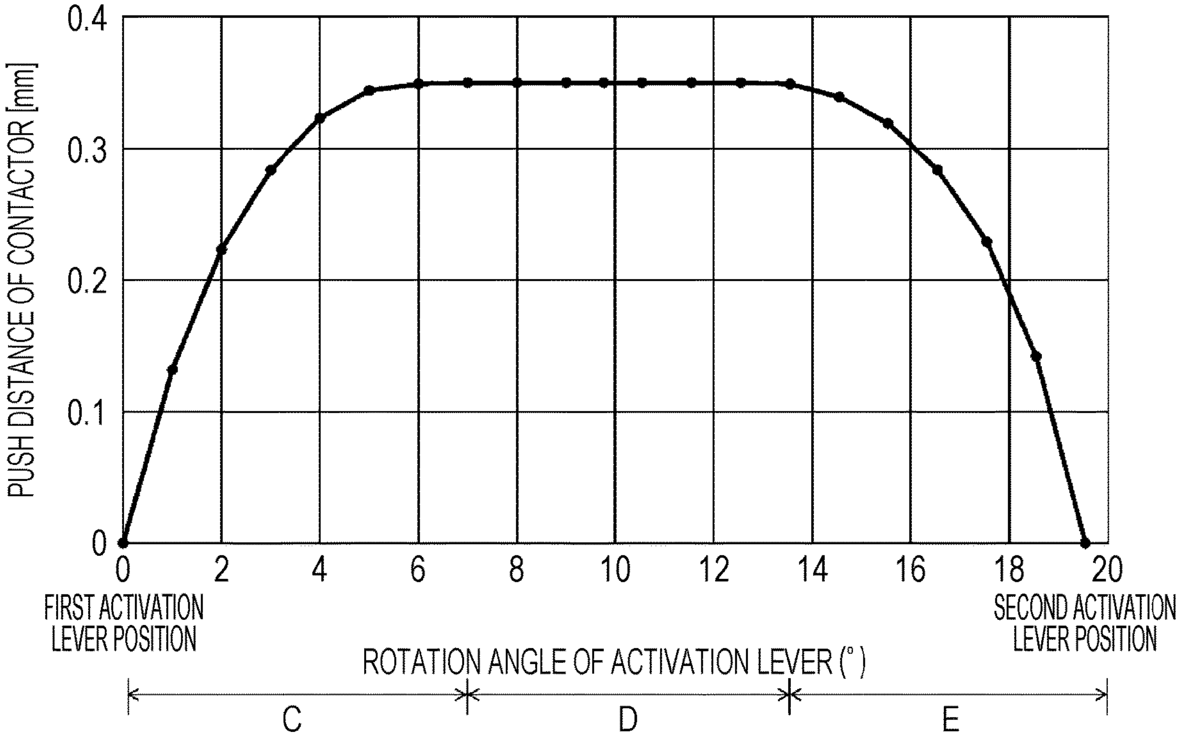
FIG. 13 is a graph showing the relationship between the rotation angle of the actuation lever and a moving distance of the contractor when the operation lever shown in FIG. 5B is used.

FIG. 13 shows the relationship, for the cam slot 56, between the rotation angle of the actuation lever 70 from the first actuation lever position and the push distance of the contact 81 along the axis Q. The period during which the smaller-diameter portion 78 of the follower 76 on the actuation lever 70 moves along the third slot 58C corresponds to an area C, the period during which the smaller-diameter portion 78 moves along the second slot 58B corresponds to an area D, and the period during which the smaller-diameter portion 78 moves along the first slot 58A corresponds to an area E.

The third slot 58C has a shape designed to allow a change in the push distance of the contact 81 in the area C and a change in the push distance of the contact 81 in the area E (also referred to as a change in the push distance of the contact 81 in the area B) to be symmetric to each other with respect to the center of the range of the rotation angle of the actuation lever 70. The second slot 58B has a shape designed to uniformize the push distance of the contact 81. The cam slot 56 with this shape allows a change in a force applied from the coil spring 82 to the operation lever 50 during the opening operation of the operation lever 50 to match a change in a force applied from the coil spring 82 to the operation lever 50 during the closing operation of the operation lever 50. Thus, the user can perform the opening operation and the closing operation of the operation lever 50 with the same operability.

The shape of the cam slot 56 in the present embodiment is a mere example. The cam slot 56 may have any shape in which the relationship between the rotation angle of the actuation lever 70 during the opening operation of the operation lever 50 and the moving distance (push distance) of the contact 81 is equal to the relationship between the rotation angle of the actuation lever 70 during the closing operation of the operation lever 50 and the moving distance (push distance) of the contact 81.

In the present embodiment, the follower 76 is divided into the larger-diameter portion 77 that is pushed by the contact 81 and the smaller-diameter portion 78 that moves along the cam slot 56 in the operation lever 50. However, the larger-diameter portion 77 and the smaller-diameter portion 78 may be integral with each other.

In the present embodiment, as described above, the cam slot 56 in the operation lever 50 and the follower 76 on the actuation lever 70 are included in the cam assembly that converts circumferential movement of the operation lever 50 to rotation of the actuation lever 70 about the shaft 64. Such a cam assembly is not limited to the example described above. For example, the actuation lever 70 may have a cam slot corresponding to the cam slot 56, the operation lever 50 may have a follower corresponding to the follower 76, and the cam slot in the actuation lever 70 and the follower on the operation lever 50 may be included in a cam assembly.

The switch 30 according to the above embodiment is used to switch the aperture blades 21 to 23 between the minimum aperture position and the maximum aperture position, but may have any use to switch any object between two switchable positions. For example, the switch 30 is usable to drive a blade other than the aperture blades 21 to 23. The camera 1 according to the above embodiment includes the three aperture blades 21 to 23 to generate vignetting on the image to be captured, but the camera 1 may include at least one aperture blade instead of three aperture blades.

The switch 30 may be used in a device other than the camera 1. In various fields, many slidable switches including a linearly slidable operation lever have been used. A switch including a linearly slidable operation lever has a relatively simple structure. However, a switch to include an operation lever slidable in the circumferential direction may have a complex structure. When the switch 30 is applied to a device to include an operation lever slidable in the circumferential direction, the device can switch the modes with a simple structure.

As described above, the camera according to one or more embodiments of the present invention may have the structures described below.

Structure 1

A camera, comprising:

at least one lens configured to form an image of a subject in a photographing area of a photographic film;

at least one aperture blade in front of the at least one lens, the at least one aperture blade being movable between a minimum aperture position at which the at least one aperture blade generates vignetting at a periphery of the photographing area and a maximum aperture position radially outward from the minimum aperture position; and a switch including an operation lever movable through a user operation and an actuation lever connected to the at least one aperture blade, the actuation lever being operable to move the at least one aperture blade between the minimum aperture position and the maximum aperture position in response to movement of the operation lever.

Structure 2

The camera according to structure 1, wherein the switch further includes a base, a cam assembly configured to convert the movement of the operation lever to rotation of the actuation lever, the cam assembly including a cam slot in one of the operation lever or the actuation lever, and a follower on the other of the operation lever or the actuation lever, the follower being engageable with the cam slot and movable along the cam slot, and a pusher configured to apply a force to the follower in the cam assembly, the operation lever in the switch is movable on the base in a circumferential direction about a first axis, the actuation lever in the switch is rotatable about a second axis, the at least one aperture blade is rotatable about a rotation axis, the cam slot in the cam assembly includes an inner portion and an outer portion located radially outward from the inner portion with respect to the first axis, and the cam slot is elongated in the circumferential direction between the inner portion and the outer portion, the follower in the cam assembly is movable between a first follower position in the inner portion of the cam slot and a second follower position in the outer portion of the cam slot, and the pusher pushes the follower in the cam assembly toward the first follower position in response to the follower being closer to the first follower position than to a reference follower position, and pushes the follower in the cam assembly toward the second follower position in response to the follower being closer to the second follower position than to the reference follower position.

Structure 3

The camera according to structure 2, wherein the pusher in the switch includes a contact movable along a third axis to come in contact with the follower in the cam assembly, and an urging member configured to urge the contact along the third axis.

Structure 4

The camera according to structure 3, wherein the cam slot in the switch is shaped to have a relationship between a rotation angle of the actuation lever about the second axis when the follower moves from the first follower position toward the reference follower position and a moving distance of the contact along the third axis being equal to a relationship between a rotation angle of the actuation lever about the second axis when the follower moves from the second follower position toward the reference follower position and a moving distance of the contact along the third axis.

Structure 5

The camera according to structure 4, wherein the cam slot in the switch includes a first slot elongated along a line connecting the inner portion and the outer portion, a second slot connecting with the first slot and elongated to have a smaller radial change with respect to the circumferential direction than the first slot, and a third slot connecting with the second slot and elongated to have a greater radial change with respect to the circumferential direction than the first slot and the second slot.

Structure 6

The camera according to any one of structures 3 to 5, wherein the follower at the reference follower position is located on the third axis.

Structure 7

The camera according to any one of structure 3 to 5, wherein the contact in the switch includes a first contact portion configured to come in contact with the follower closer to the first follower position than to the reference follower position, and a second contact portion configured to come in contact with the follower closer to the second follower position than to the reference follower position, and the second contact portion is symmetric with the first contact portion.

Structure 8

The camera according to any one of structures 2 to 7, wherein the base in the switch includes a stopper configured to restrict the movement of the operation lever in the circumferential direction.

The switch according to one or more embodiments of the present invention may have the structures described below.

Structure 9

A switch, comprising:

a base;

an operation lever movable on the base in a circumferential direction about a first axis;

an actuation lever rotatable about a second axis;

a cam assembly configured to convert movement of the operation lever to rotation of the actuation lever, the cam assembly including a cam slot in one of the operation lever or the actuation lever, and a follower on the other of the operation lever or the actuation lever, the follower being engageable with the cam slot and movable along the cam slot; and a pusher configured to apply a force to the follower in the cam assembly, wherein the cam slot in the cam assembly includes an inner portion and an outer portion located radially outward from the inner portion with respect to the first axis, and the cam slot is elongated in the circumferential direction between the inner portion and the outer portion, the follower in the cam assembly is movable between a first follower position in the inner portion of the cam slot and a second follower position in the outer portion of the cam slot, and the pusher pushes the follower in the cam assembly toward the first follower position in response to the follower being closer to the first follower position than to a reference follower position, and pushes the follower in the cam assembly toward the second follower position in response to the follower being closer to the second follower position than to the reference follower position.

Structure 10

The switch according to structure 9, wherein the pusher includes a contact movable along a third axis to come in contact with the follower in the cam assembly, and an urging member configured to urge the contact along the third axis.

Structure 11

The switch according to structure 10, wherein the cam slot in the cam assembly is shaped to have a relationship between a rotation angle of the actuation lever about the second axis when the follower moves from the first follower position toward the reference follower position and a moving distance of the contact along the third axis being equal to a relationship between a rotation angle of the actuation lever about the second axis when the follower moves from the second follower position toward the reference follower position and a moving distance of the contact along the third axis.

Structure 12

The switch according to structure 11, wherein the cam slot in the cam assembly includes a first slot elongated along a line connecting the inner portion and the outer portion, a second slot connecting with the first slot and elongated to have a smaller radial change with respect to the circumferential direction than the first slot, and a third slot connecting with the second slot and elongated to have a greater radial change with respect to the circumferential direction than the first slot and the second slot.

Structure 13

The switch according to any one of structures 10 to 12, wherein the follower at the reference follower position is located on the third axis.

Structure 14

The switch according to any one of structures 10 to 13, wherein the contact includes a first contact portion configured to come in contact with the follower closer to the first follower position than to the reference follower position, and a second contact portion configured to come in contact with the follower closer to the second follower position than to the reference follower position, and the second contact portion is symmetric with the first contact portion.

Structure 15

The switch according to any one of structures 9 to 14, wherein the base includes a stopper configured to restrict the movement of the operation lever in the circumferential direction.

The camera according to one or more embodiments of the present invention may have the structure described below.

Structure 16

A camera, comprising:

the switch according to any one of structures 9 to 15.

Although the embodiments of the present invention have been described above, the present invention is not limited to the above embodiments and may be modified variously within the scope of its technical idea.

What is claimed is:

1. A camera, comprising:

at least one lens configured to form an image of a subject in a photographing area of a photographic film;

at least one aperture blade in front of the at least one lens, the at least one aperture blade being movable between a minimum aperture position at which the at least one aperture blade generates vignetting at a periphery of the photographing area and a maximum aperture position radially outward from the minimum aperture position; and a switch including an operation lever movable through a user operation and an actuation lever connected to the at least one aperture blade, the actuation lever being operable to move the at least one aperture blade between the minimum aperture position and the maximum aperture position in response to movement of the operation lever, wherein the switch further includes a base, a cam assembly configured to convert the movement of the operation lever to rotation of the actuation lever, the cam assembly including a cam slot in one of the operation lever or the actuation lever, and a follower on the other of the operation lever or the actuation lever, the follower being engageable with the cam slot and movable along the cam slot, and a pusher configured to apply a force to the follower in the cam assembly, the operation lever in the switch is movable on the base in a circumferential direction about a first axis, the actuation lever in the switch is rotatable about a second axis, the at least one aperture blade is rotatable about a rotation axis, the cam slot in the cam assembly includes an inner portion and an outer portion located radially outward from the inner portion with respect to the first axis, and the cam slot is elongated in the circumferential direction between the inner portion and the outer portion, the follower in the cam assembly is movable between a first follower position in the inner portion of the cam slot and a second follower position in the outer portion of the cam slot, and the pusher pushes the follower in the cam assembly toward the first follower position in response to the follower being closer to the first follower position than to a reference follower position, and pushes the follower in the cam assembly toward the second follower position in response to the follower being closer to the second follower position than to the reference follower position.

2. The camera according to claim 1, wherein the pusher in the switch includes a contact movable along a third axis to come in contact with the follower in the cam assembly, and an urging member configured to urge the contact along the third axis.

3. The camera according to claim 2, wherein the cam slot in the switch is shaped to have a relationship between a rotation angle of the actuation lever about the second axis when the follower moves from the first follower position toward the reference follower position and a moving distance of the contact along the third axis being equal to a relationship between a rotation angle of the actuation lever about the second axis when the follower moves from the second follower position toward the reference follower position and a moving distance of the contact along the third axis.

4. The camera according to claim 3, wherein the cam slot in the switch includes a first slot elongated along a line connecting the inner portion and the outer portion, a second slot connecting with the first slot and elongated to have a smaller radial change with respect to the circumferential direction than the first slot, and a third slot connecting with the second slot and elongated to have a greater radial change with respect to the circumferential direction than the first slot and the second slot.

5. The camera according to claim 2, wherein the follower at the reference follower position is located on the third axis.

6. The camera according to claim 2, wherein the contact in the switch includes a first contact portion configured to come in contact with the follower closer to the first follower position than to the reference follower position, and a second contact portion configured to come in contact with the follower closer to the second follower position than to the reference follower position, and the second contact portion is symmetric with the first contact portion.

7. The camera according to claim 1, wherein the base in the switch includes a stopper configured to restrict the movement of the operation lever in the circumferential direction.

8. A switch, comprising:

a base;

an operation lever movable on the base in a circumferential direction about a first axis;

an actuation lever rotatable about a second axis;

a cam assembly configured to convert movement of the operation lever to rotation of the actuation lever, the cam assembly including a cam slot in one of the operation lever or the actuation lever, and a follower on the other of the operation lever or the actuation lever, the follower being engageable with the cam slot and movable along the cam slot; and a pusher configured to apply a force to the follower in the cam assembly, wherein the cam slot in the cam assembly includes an inner portion and an outer portion located radially outward from the inner portion with respect to the first axis, and the cam slot is elongated in the circumferential direction between the inner portion and the outer portion, the follower in the cam assembly is movable between a first follower position in the inner portion of the cam slot and a second follower position in the outer portion of the cam slot, and the pusher pushes the follower in the cam assembly toward the first follower position in response to the follower being closer to the first follower position than to a reference follower position, and pushes the follower in the cam assembly toward the second follower position in response to the follower being closer to the second follower position than to the reference follower position.

9. The switch according to claim 8, wherein the pusher includes a contact movable along a third axis to come in contact with the follower in the cam assembly, and an urging member configured to urge the contact along the third axis.

10. The switch according to claim 9, wherein the cam slot in the cam assembly is shaped to have a relationship between a rotation angle of the actuation lever about the second axis when the follower moves from the first follower position toward the reference follower position and a moving distance of the contact along the third axis being equal to a relationship between a rotation angle of the actuation lever about the second axis when the follower moves from the second follower position toward the reference follower position and a moving distance of the contact along the third axis.

11. The switch according to claim 10, wherein the cam slot in the cam assembly includes a first slot elongated along a line connecting the inner portion and the outer portion, a second slot connecting with the first slot and elongated to have a smaller radial change with respect to the circumferential direction than the first slot, and a third slot connecting with the second slot and elongated to have a greater radial change with respect to the circumferential direction than the first slot and the second slot.

12. The switch according to claim 9, wherein the follower at the reference follower position is located on the third axis.

13. The switch according to claim 9, wherein the contact includes a first contact portion configured to come in contact with the follower closer to the first follower position than to the reference follower position, and a second contact portion configured to come in contact with the follower closer to the second follower position than to the reference follower position, and the second contact portion is symmetric with the first contact portion.

14. The switch according to claim 8, wherein the base includes a stopper configured to restrict the movement of the operation lever in the circumferential direction.

15. A camera, comprising:

the switch according to claim 8.

* * * * *